(12) United States Patent
Omura

(10) Patent No.: US 7,870,099 B2
(45) Date of Patent: Jan. 11, 2011

(54) COMPUTER READABLE RECORDING MEDIUM HAVING STORED THEREIN DATABASE SYNCHRONIZING PROCESS PROGRAM, AND APPARATUS FOR AND METHOD OF PERFORMING DATABASE SYNCHRONIZING PROCESS

(75) Inventor: Kazuya Omura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 119 days.

(21) Appl. No.: 11/586,911

(22) Filed: Oct. 26, 2006

(65) Prior Publication Data

US 2008/0005189 A1   Jan. 3, 2008

(30) Foreign Application Priority Data

Jun. 30, 2006 (JP) .............................. 2006-180839

(51) Int. Cl.
G06F 7/00 (2006.01)
G06F 17/00 (2006.01)

(52) U.S. Cl. ........................................ 707/625; 707/638

(58) Field of Classification Search .................. None
See application file for complete search history.

(56) References Cited

U.S. PATENT DOCUMENTS

| | | | | |
|---|---|---|---|---|
| 5,774,717 | A * | 6/1998 | Porcaro | 707/202 |
| 6,301,643 | B1 * | 10/2001 | Crockett et al. | 711/162 |
| 6,341,316 | B1 * | 1/2002 | Kloba et al. | 709/248 |
| 6,581,075 | B1 * | 6/2003 | Guturu et al. | 707/201 |
| 6,631,386 | B1 * | 10/2003 | Arun et al. | 707/203 |
| 6,643,669 | B1 * | 11/2003 | Novak et al. | 707/201 |
| 2001/0005849 | A1 * | 6/2001 | Boothby et al. | 707/1 |
| 2003/0131009 | A1 * | 7/2003 | Frey et al. | 707/100 |
| 2004/0024795 | A1 * | 2/2004 | Hind et al. | 707/204 |
| 2004/0193370 | A1 * | 9/2004 | Umezu et al. | 701/210 |
| 2006/0010300 | A1 * | 1/2006 | Arakawa et al. | 711/162 |
| 2006/0106888 | A1 * | 5/2006 | Iida et al. | 707/203 |
| 2006/0123100 | A1 * | 6/2006 | McKenney et al. | 709/223 |
| 2006/0200502 | A1 * | 9/2006 | Tanaka et al. | 707/203 |
| 2006/0265173 | A1 * | 11/2006 | Mishima et al. | 702/118 |
| 2007/0185924 | A1 * | 8/2007 | Kawamura | 707/202 |
| 2008/0005503 | A1 * | 1/2008 | Rudelic | 711/156 |

FOREIGN PATENT DOCUMENTS

| | | |
|---|---|---|
| JP | 2002-366407 | 12/2002 |
| JP | 2005-250819 | 9/2005 |

* cited by examiner

*Primary Examiner*—Pierre M Vital
*Assistant Examiner*—Augustine Obisesan
(74) *Attorney, Agent, or Firm*—Fujitsu Patent Center

(57) ABSTRACT

A program applicable to a computer system for executing a database synchronizing process, which reflects, onto a database of one server, updating of a database of another server by the use of a business application of such another server, when updating information data in which pieces of updating information capable of specifying pre-updating and post-updating states in the database of the another server are held for every unit of transactions are received, executes determination as to whether or not any logical inconsistency occurs between the databases, if the databases of the one and another servers are updated depending on the updating information of the updating information data. When no inconsistency occurs, the databases are updated depending on the updating information. When the inconsistency occurs, an error log is output. The program is recorded on a computer readable recording medium.

13 Claims, 5 Drawing Sheets

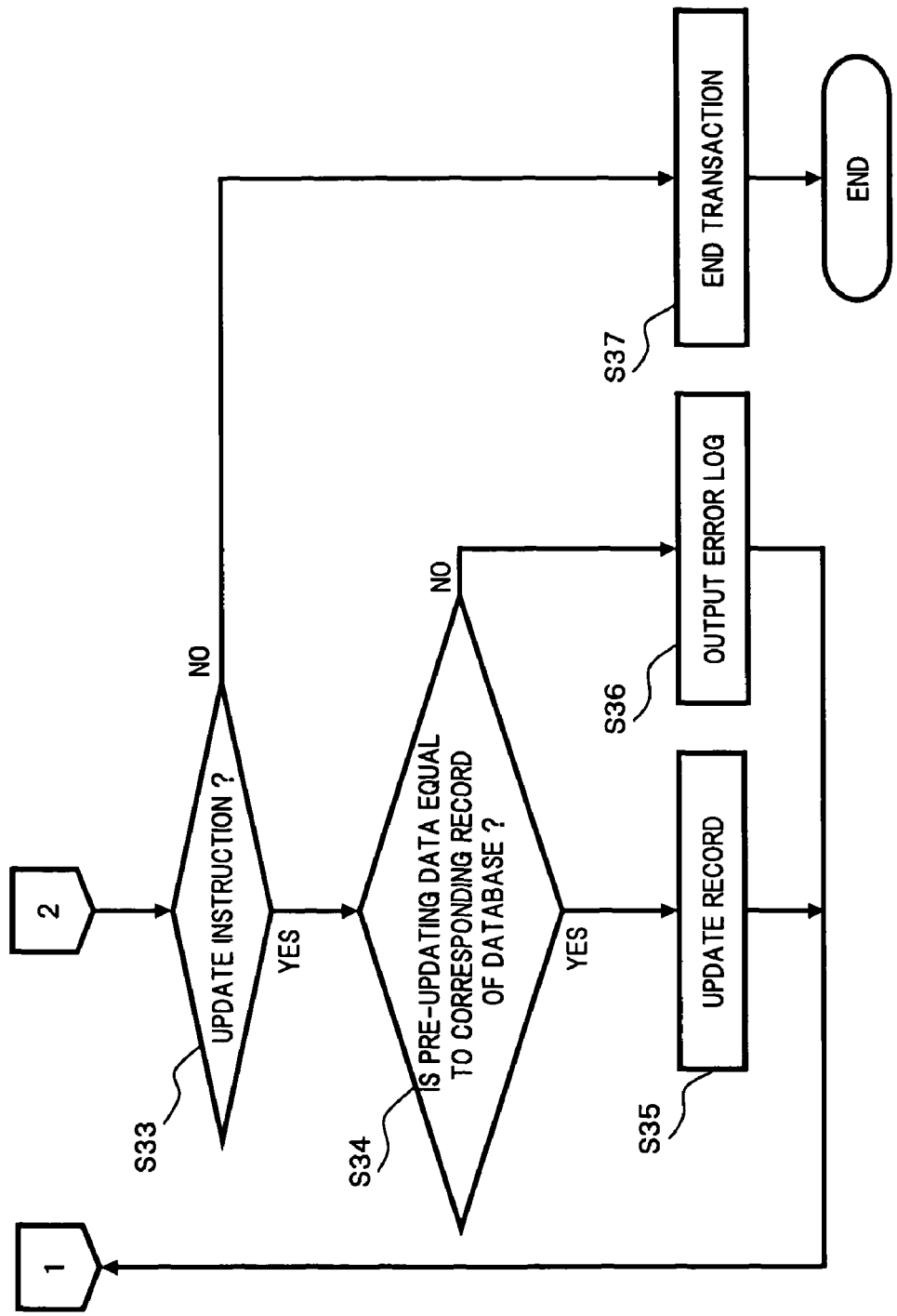

COMPUTER READABLE RECORDING MEDIUM HAVING STORED THEREIN DATABASE SYNCHRONIZING PROCESS PROGRAM, AND APPARATUS FOR AND METHOD OF PERFORMING DATABASE SYNCHRONIZING PROCESS

BACKGROUND OF THE INVENTION

1. Field of the Invention

The present invention relates generally to a computer technology, and more particularly relates to a technique for performing a synchronizing process between databases by the use of a computer system.

2. Description of the Related Art

During shifting from an existing computer system to a new computer system executed for the purpose of increasing a processing capacity or the like, it is often employed that a business application used for updating a database may be gradually shifted from one fitting to the existing server to another fitting to the new server while continuing an operation of the existing server. In such shifting, business applications of the respective servers must independently update their own databases provided, respectively, for the existing and the new servers in a condition where both databases are always maintained to be equivalent to each other. In this configuration, in order to keep matching between the database of the existing server and that of the new server, a synchronizing process which reflects updating of the respective databases on each other must indispensably be done.

In general, as a conventional technique which performs a synchronizing process, as described in Japanese Unexamined Patent Publication No. 2002-366407, a technique utilizing a replica is widely used for closely reflecting updating made for a master database onto another database that is a replica of the master database.

However, in such conventional synchronizing process technique utilizing the replica database of the master database, a master-servant relationship is given to the two databases, and updating one database is one-sidedly reflected on the other database. For this reason, when the respective databases are independently updated, in the conventional synchronizing process, logical inconsistency may occur as follows. Specifically, a record changed by a business application may be overwritten by an updating content of another database. Furthermore, when a synchronizing process is performed in a state in which updating is performed for the respective databases so as to register records having the same key in the databases, double registration of the records having the same key might be performed. In addition, when the synchronizing process is performed in the state in which updating is performed for the respective databases to delete records having the same key from the databases, double deletion of the records having the same key might occur.

Therefore, taking into consideration the above conventional problems up to now, an object of the present invention is to perform a synchronizing process without causing logical inconsistency to occur between the databases even though independent updating of databases that are kept to be equivalent to each other has been done.

SUMMARY OF THE INVENTION

For this reason, in the present invention, in a network computing environment which is constructed by servers respectively having databases, when a synchronizing process is performed between a database of one server and a database of another server, updating information which is collected by the latter server and which can specify pre-updating and post-updating states in the database of the latter server is firstly referred to. Then, when the database of the former server is updated depending on the updating information, it is determined whether or not logical inconsistency occurs between the databases. Thus, when it is determined that no inconsistency occurs, the database is updated according to the updating information.

To this effect, when any logical inconsistency occurs between the databases, the updating is not reflected, a record changed by a business application on one database can be prevented from being overwritten by an updating content of the other database, or the records having the same key can be prevented from being double-registered or double-deleted. Therefore, a synchronizing process can be perfectly performed without causing logical inconsistency between the databases to occur.

Other objects, features, advantages and various aspects of the invention will become more apparent from the ensuing explanation about preferred embodiments with reference to the accompanying drawings.

BRIEF DESCRIPTION OF THE DRAWINGS

FIG. 5 is a flow chart showing the process executed by the updating information reflecting unit.

DESCRIPTION OF THE PREFERRED EMBODIMENTS

Hereinbelow, a description of the present invention will be provided in detail with reference to the accompanying drawings.

Figure 1:
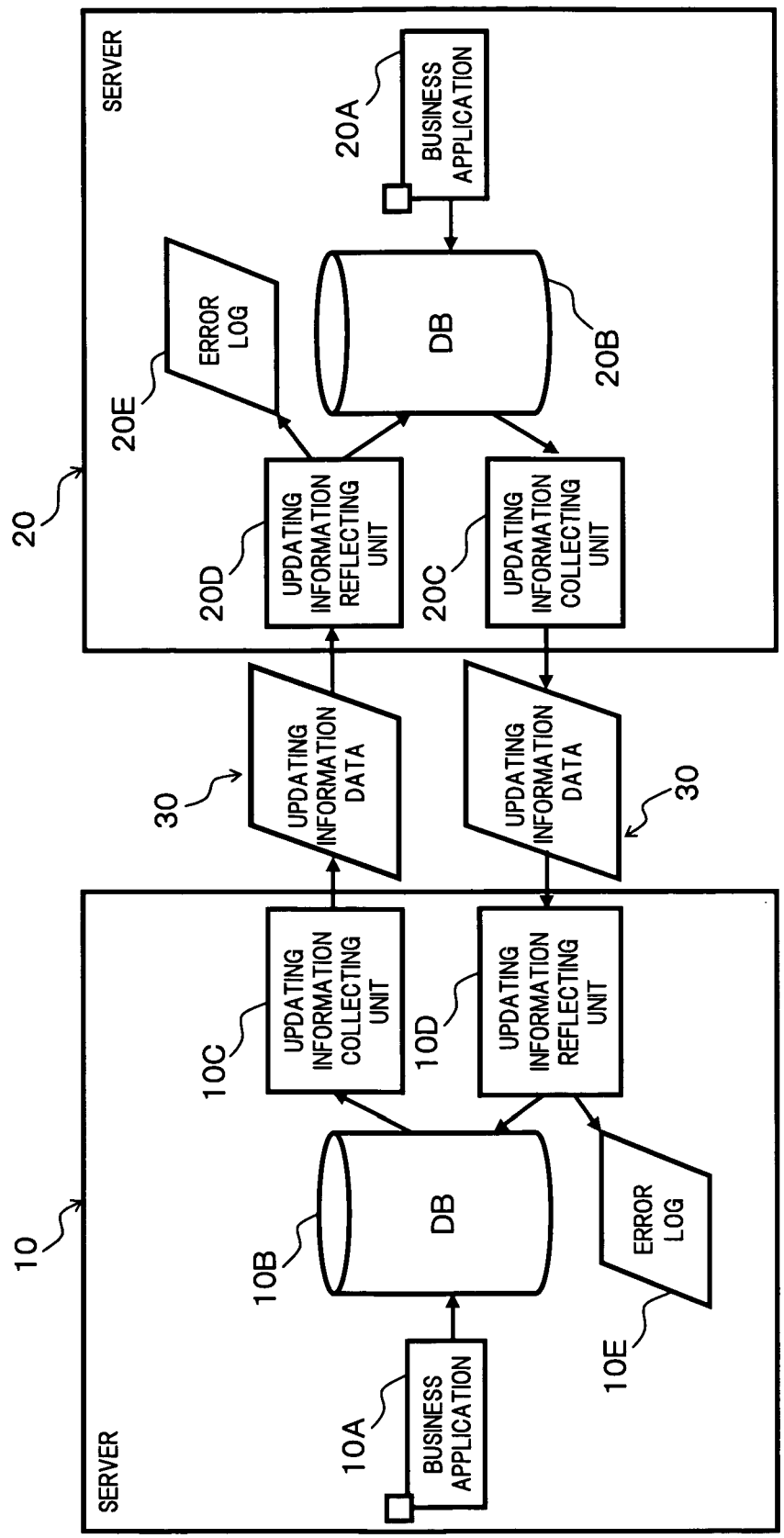
FIG. 1 is a functional schematic view of a database synchronizing process apparatus obtained by embodying the present invention.

FIG. 1 shows a functional outline diagram illustrating a database synchronizing process apparatus obtained by embodying the present invention. The database synchronizing process apparatus includes a server 10 and another server 20, each containing therein a business application which is provided for updating a database. It is assumed that the "updating" includes a registering process performed by an INSERT instruction, a changing process performed by an UPDATE instruction, and a deleting process performed by a DELETE instruction.

Each of the servers 10 and 20 is constituted by a computer including at least a central processing unit (CPU), a memory, and an external storage unit. The server 10 is constituted by a business application 10A, a database 10B managed by a DBMS (Database Management System), an updating information collecting unit 10C, and an updating information reflecting unit 10D. It is to be noted that a database synchronizing process program recorded on a computer readable recording medium such as a CD-ROM or a DVD-ROM is installed onto the server 10 and is executed to realize the updating information collecting unit 10C and the updating information reflecting unit 10D. Like the server 10, the server 20 includes a business application 20A, a database 20B managed by a DBMS, an updating information collecting unit 20C, and an updating information reflecting unit 20D. The database 10B of the server 10 and the database 20B of the server 20 should be equivalent to each other in operation.

The business application 10A of the server 10 processes a transaction including a database operating instruction to update the database 10B. When a transaction of updating the database 10B is processed, the updating information collecting unit 10C collects control information of the start and end of the transaction and pieces of updating information which can specify pre-updating and post-updating states in the database 10B to generate updating information data 30 in which the pieces of updating information are held for every unit of the processed transactions. Furthermore, the updating information collecting unit 10C transmits the updating information data 30 to the different server 20 through a network. The updating information reflecting unit 10D functions as a determining step, determining means, an updating step, updating means, a generating step, generating means, an output step, and output means. When the updating information reflecting unit 10D receives the updating information data 30 from the server 20, the updating information reflecting unit 10D determines whether or not logical inconsistency occurs if the database 10B is updated depending on the received updating information. Thus, the updating information reflecting unit 10D updates the database 10B depending on the updating information when inconsistency does not occur, and when it occurs, the updating information reflecting unit 10D generates and outputs an error log 10E representing the inconsistency content to the external storage unit of the server 10.

The business application 20A, the database 20B, the updating information collecting unit 20C, and the updating information reflecting unit 20D in the server 20 have the same functions as those of the business application 10A, the database 10B, the updating information collecting unit 10C, and the updating information reflecting unit 10D in the server 10, respectively.

A flow of a synchronizing process which reflects updating performed onto the database 10B by the business application 10A in the server 10 in the database 20B in the server 20 will be described below. In the updating information collecting unit 10C, when the database 10B is updated by the business application 10A, updating information is collected to generate the updating information data 30. Further, in the updating information collecting unit 10C, the updating information data 30 is transmitted to the updating information reflecting unit 20D in the server 20. On the other hand, in the updating information reflecting unit 20D in the server 20, if the database 20B is updated depending on the updating information of the received updating information data 30, it is determined whether or not logical inconsistency occurs between the database 10B and the database 20B. In the updating information reflecting unit 20D, when no inconsistency occurs, the database 20B is updated depending on the received updating information data 30, but when inconsistency occurs, an error log 20E is generated and is outputted to, for example, an appropriate medium.

Figure 2:
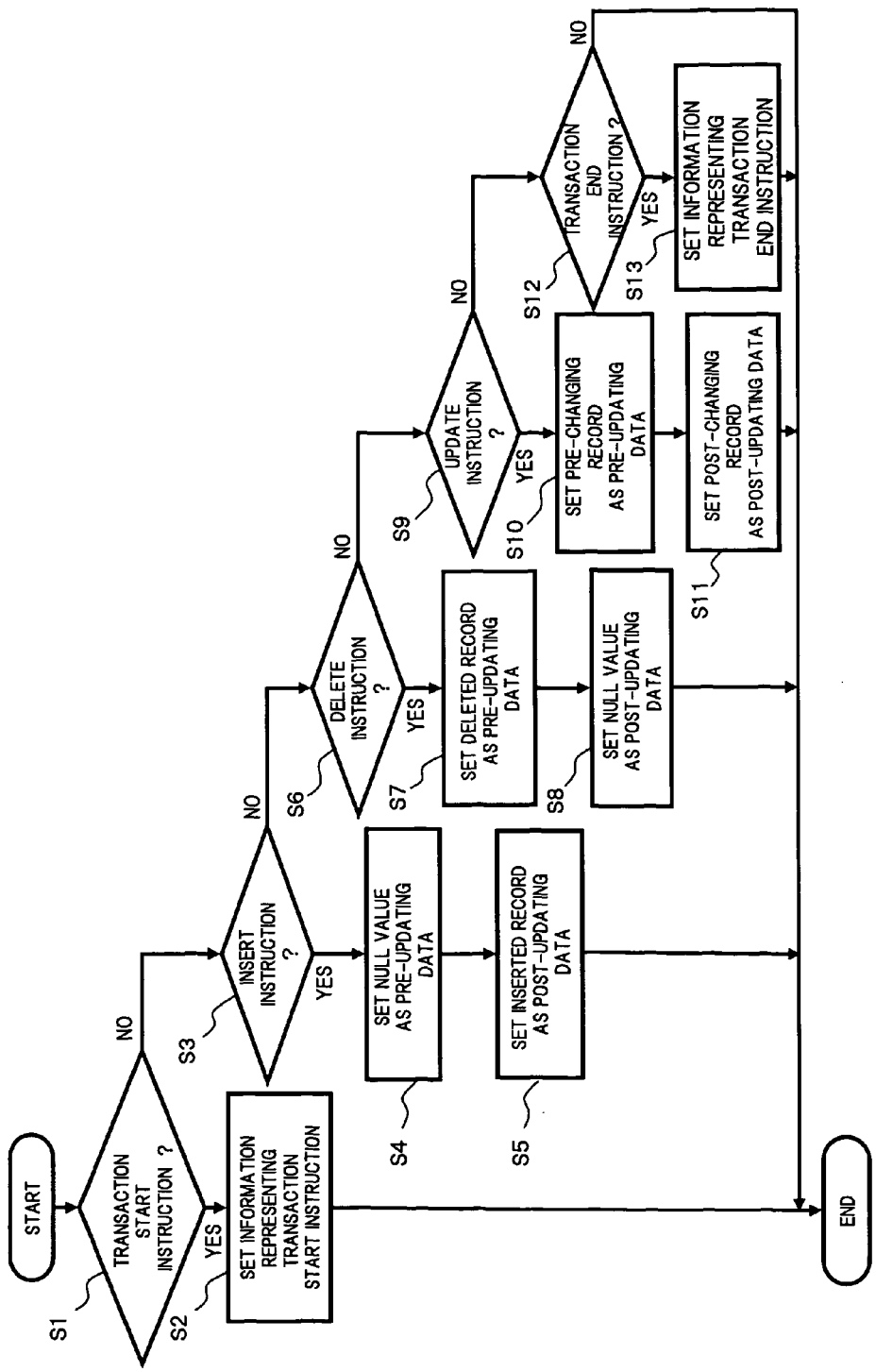
FIG. 2 is a flow chart showing a process executed by an updating information collecting unit.

FIG. 2 shows the content of a collecting process which is executed by the updating information collecting unit 10C each time a database operation instruction of a transaction of updating the database 10B is processed by the business application 10A.

In step 1 (abbreviated as "S1" in FIG. 2 hereinafter), the updating information collecting unit 10C determines whether or not the database operation instruction is a transaction start instruction. When the database operation instruction is the transaction start instruction, the step of the collecting process proceeds to step 2 (Yes). When the database operation instruction is not the transaction start instruction, the step of the collecting process proceeds to step 3 (No).

Figure 3:
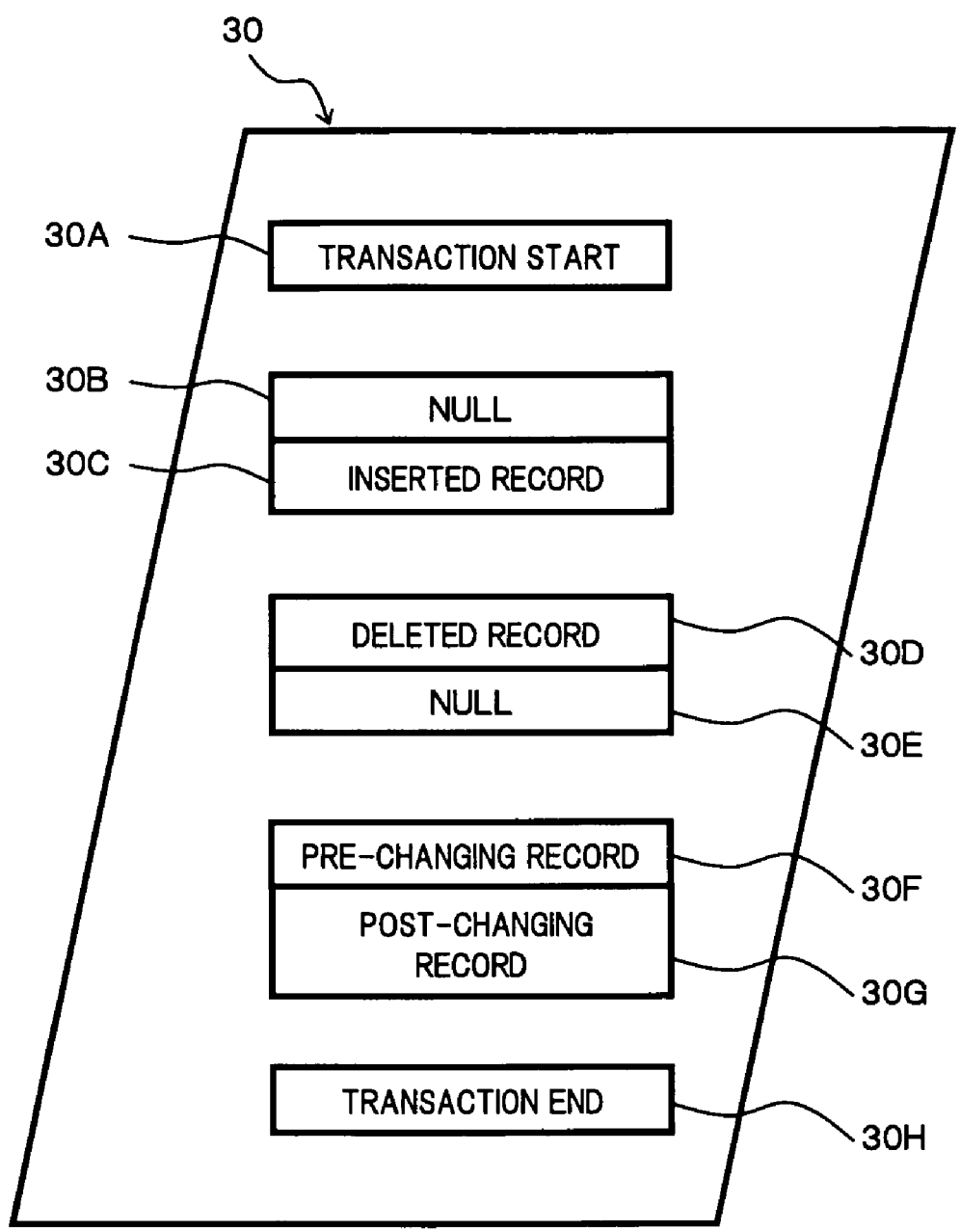
FIG. 3 is an explanation view updating information data.

In step 2, as shown in FIG. 3, data 30A representing that the instruction is the transaction start instruction is set in the updating information data 30 as updating information constituting the updating information data 30, and is ended.

In step 3, the updating information collecting unit 10C determines whether or not the database operation instruction is an INSERT instruction. When the database operation instruction is the INSERT instruction, the step of the collecting process proceeds to step 4 (Yes). When the database operation instruction is not the INSERT instruction, the step of the collecting process proceeds to step 6 (No).

In step 4, as pre-updating data representing a pre-updating state of an updated record that was to be updated in the database 10B, an identifier (for example, NULL value) 30B as shown in FIG. 3, which represents the absence of a record is set in the updating information data 30.

In step 5, as post-updating data representing a post-updating state of the updated record, as shown in FIG. 3, a registered record 30C is set in the updating information data 30. The pre-updating data and the post-updating data respectively set in step 4 and step 5 constitute one piece of updating information.

In step 6, the updating information collecting unit 10C determines whether or not the database operation instruction is a DELETE instruction. When the database operation instruction is the DELETE instruction, the step of the collecting process proceeds to step 7 (Yes). When the database operation instruction is not the DELETE instruction, the step of the collecting process proceeds to step 9 (No).

In step 7, as shown in FIG. 3, a deleted record 30D is set in the updating information data 30 as the pre-updating data.

In step 8, an identifier 30E as shown in FIG. 3, which represents the absence of a record is set in the updating information data 30 as the post-updating data. The pre-updating data and the post-updating data respectively set in step 7 and step 8 constitute one piece of updating information.

In step 9, the updating information collecting unit 10C determines whether or not the database operation instruction is an UPDATE instruction. When the database operation instruction is the UPDATE instruction, the step of the collecting process proceeds to step 10 (Yes). When the database operation instruction is not the UPDATE instruction, the step of the collecting process proceeds to step 12 (No).

In step 10, a pre-changing record 30F as shown in FIG. 3 is set in the updating information data 30 as the pre-updating data.

In step 11, a post-changing record 30G as shown in FIG. 3 is set in the updating information data 30 as the post-updating data. The pre-updating data and the post-updating data respectively set in step 10 and step 11 constitute one piece of updating information.

In step 12, the updating information collecting unit 10C determines whether or not the database operation instruction is a transaction end instruction. When the database operation instruction is the transaction end instruction, the step of the collecting process proceeds to step 13 (Yes). When the database operation instruction is not the transaction end instruction, the step of the collecting process terminates the process (No).

In step 13, data 30H as shown in FIG. 3, which represents that the instruction is the transaction end instruction is set in the updating information data 30 as the updating information.

With the collecting process, pieces of updating information having pre-updating data and post-updating data which can respectively specify pre-updating and post-updating states in the database 10B or data representing the start of a transaction or the end of the transaction is collected. The updating information data 30 which hold the pieces of updating information for every unit of transactions is generated. In this case, when the updating process made onto the database 10B is a registering process, in the pre-updating data and the post-updating data, an identifier representing the absence of a record and a record registered in the database are set, respectively. Further, when the updating process made onto the database 10B is a deleting process, in the pre-updating data and the post-updating data, a record deleted from the database and an identifier are set, respectively. Furthermore, when the updating process made onto the database 10B is a changing process, in the pre-updating data and the post-updating data, a pre-changing record and a post-changing record are set, respectively. For this reason, on the basis of manners of setting the identifier and the record in the pre-updating data and the post-updating data, an updating content of the database 10B can be specified.

Furthermore, in the updating information collecting unit 10C, the updating information data 30 is transmitted to the updating information reflecting unit 20D of the server 20. In this case, each time a transaction of updating for the database 10B is processed, the updating information data 30 may be transmitted, or the updating information data 30 having updating information of a plurality of transactions may be transmitted by a file interface or the like using a job scheduled every predetermined period of time that was set in advance. When the updating information data 30 is transmitted each time a transaction of updating is processed, a frequency of a synchronizing process between databases becomes high to make it difficult to cause inconsistency between the databases. In addition, when the updating information data 30 is transmitted every predetermined period of time, a load on a network is reduced.

Figure 4:
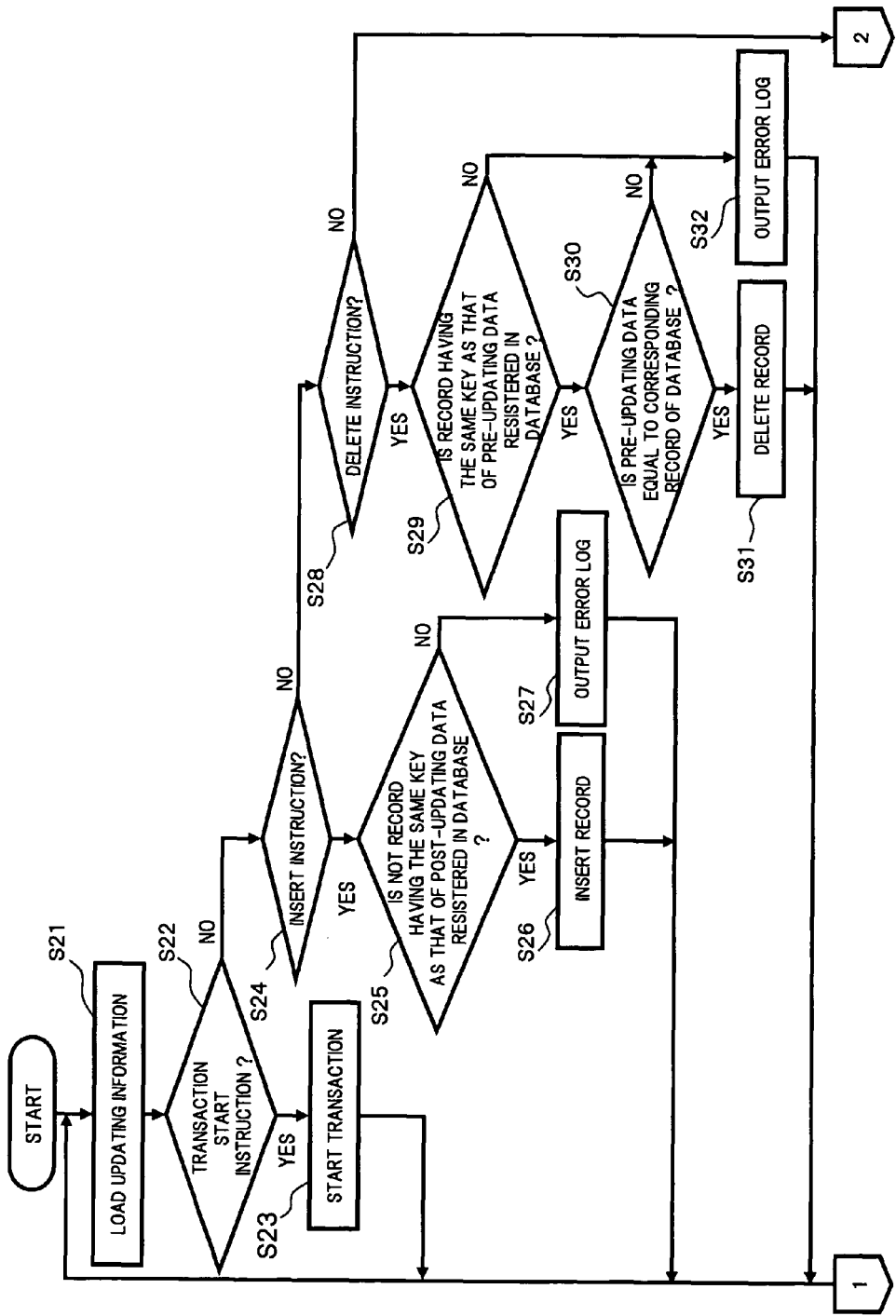
FIG. 4 is a flow chart showing a process executed by an updating information reflecting unit.

FIG. 4 shows a content of reflecting process executed by the updating information reflecting unit 20D. The reflecting process is executed when the updating information reflecting unit 20D receives the updating information data 30.

In step 21, one piece of updating information for every unit of transactions is loaded by reading from the updating information data 30 in the order of setting of the pieces of updating information in the updating information data 30 in the collecting process, i.e., in the order in which the database 10B is updated.

In step 22, the updating information reflecting unit 20D determines whether or not the updating information is data representing the start of a transaction. When the updating information is the data representing the start of the transaction, the step of the reflecting process proceeds to step 23 (Yes). When the updating information is not the data representing the start of the transaction, the step of the reflecting process proceeds to step 24 (No).

In step 23, a transaction which reflects updating of the database 10B onto the database 20B is started.

In step 24, the updating information reflecting unit 20D determines whether or not the updating information is obtained by an INSERT instruction. In this case, when an identifier representing the absence of a record is set in pre-updating data, it is determined that the updating information is obtained by the INSERT instruction. When the updating information is obtained by the INSERT instruction, the step of the reflecting process proceeds to step 25 (Yes). When the updating information is not obtained by the INSERT instruction, the step of the reflecting process proceeds to step 28 (No).

In step 25, the database 20B is searched for a corresponding record having the same key as that of the record set in the post-updating data, and the updating information reflecting unit 20D determines whether or not the corresponding record is present. When the corresponding record is absent, the step of the reflecting process proceeds to step 26 (Yes). When the corresponding record is present, the step of the reflecting process proceeds to step 27 (No).

In step 26, the record set in the post-updating data is registered in the database 20B.

In step 27, the error log 20E is generated and is outputted to the external storage unit of the server 20. In the error log 20E, the name of a database to be updated, a date and time at which the error log is outputted, information representing that the database operation instruction is the INSERT instruction, a record set in the post-updating data, a corresponding record of the database 20B having the same key as that of the record set in the post-updating data, and the like are included.

In step 28, the updating information reflecting unit 20D determines whether or not the updating information is obtained by a DELETE instruction. In this case, when an identifier representing the absence of a record is set in the post-updating data, the updating information reflecting unit 20D determines that the updating information is obtained by the DELETE instruction. When the updating information is obtained by the DELETE instruction, the step of the reflecting process proceeds to step 29 (Yes). When the updating information is not obtained by the DELETE instruction, the step of the reflecting process proceeds to step 33 (No).

In step 29, the database 20B is searched for a corresponding record having the same key as that of the record set in the pre-updating data, and the updating information reflecting unit 20D determines whether or not the corresponding record is present. When the corresponding record is present, the step of the reflecting process proceeds to step 30 (Yes). When the corresponding record is absent, the step of the reflecting process proceeds to step 32 (No).

In step 30, the updating information reflecting unit 20D determines whether or not the record set in the pre-updating data is equal to the corresponding record of the database 20B having the same key as that of the record set in the pre-updating data. When the corresponding record is equal to the record set in the pre-updating data, the step of the reflecting process proceeds to step 31 (Yes). When the corresponding record is not equal to the record set in the pre-updating data, the step of the reflecting process proceeds to step 32 (No).

In step 31, the corresponding record having the same key as that of the record set in the pre-updating data is deleted from the database 20B.

In step 32, the error log 20E is generated and is outputted to the external storage unit of the server 20. The error log 20E includes a name of a database to be updated, a date and time at which the error log is outputted, information representing that the database operation instruction is the DELETE instruction, a record set in the pre-updating data, a corresponding record of the database 20B having the same key as that of the record set in the pre-updating data, and so on.

In step 33, the updating information reflecting unit 20D determines whether or not the updating information is obtained by the UPDATE instruction. In this case, when records are set in the pre-updating data and the post-updating data, respectively, the updating information reflecting unit 20D determines that the updating information is obtained by the UPDATE instruction. When the updating information is obtained by the UPDATE instruction, the step of the reflecting process proceeds to step 34 (Yes). When the updating information is not obtained by the UPDATE instruction, the step of the reflecting process proceeds to step 37 (No).

In step 34, the database 20B is searched for a corresponding record having the same key as that of the record set in the pre-updating data, and the updating information reflecting unit 20D determines whether or not the corresponding record is equal to the record set in the pre-updating record. When the corresponding record is absent in the database 20B, it is determined that the corresponding record is not equal to the record set in the pre-updating data. When the corresponding record is equal to the record set in the pre-updating data, the step of the reflecting process proceeds to step 35 (Yes). When the corresponding record is not equal to the record set in the pre-updating data, the step of the reflecting process proceeds to step 36 (No).

In step 35, the database 20B is changed in a manner such that the corresponding record of the database 20B having the same key as that of the record set in the pre-updating data is made equal to the record set in the post-updating data. More specifically, the corresponding record of the database 20B having the same key as that of the record set in the pre-updating data is overwritten by the record set in the post-updating data.

In step 36, the error log 20E is generated and outputted to the external storage unit of the server 20. The error log 20E is permitted to include the name of a database to be updated, a date and time at which the error log is outputted, information representing that the database operation instruction is the UPDATE instruction, a record set in the pre-updating data and the post-updating data, a corresponding record of the database 20B having the same key as that of the record set in the pre-updating data and so on.

In step 37, a transaction which reflects the updating of the database 10B onto the database 20B is terminated.

In the reflecting process, step 25, step 29, step 30, and step 34 correspond to the determining step and the determining means. Further, step 26, step 31, and step 35 correspond to the updating step and the updating means. Furthermore, step 27, step 32, and step 36 correspond to the generating step, the generating means, the output step, and the output means.

According to the reflecting process, the updating content of the database 10B is specified on the basis of manners of setting the record or the identifier in the pre-updating data and the post-updating data of the updating information. It is determined whether logical inconsistency occurs when the database 20B is updated depending on the updating content. Only when it is determined that the inconsistency does not occur, the updating in the database 10B is reflected in the database 20B.

More specifically, when an identifier representing the absence of a record is set in the pre-updating data, it is specified that the record set in the post-updating data has been registered in the database 10B by an INSERT instruction. Only when the corresponding record having the same key as that of the record set in the post-updating data is absent in the database 20B, the record set in the post-updating data is registered in the database 20B. For this reason, when the corresponding record having the same key as that of the record set in the post-updating data is present in the database 20B, the registration is not performed. Therefore, double registration of the record having the same key is avoided.

Further, when the identifier is set in the post-updating data, it is specified that the record set in the pre-updating data has been deleted from the database 10B by a DELETE instruction. Only when the corresponding record having the same key as that of the record set in the pre-updating data is present in the database 20B, the corresponding record is deleted from the database 20B. Hence, when the corresponding record having the same key as that of the record set in the pre-updating data is absent in the database 20B, the deletion is not performed and therefore, double deletion of the record having the same key can be avoided.

Furthermore, when the records are set in the pre-updating data and the post-updating data, it is specified that the database 10B has been changed such that the record set in the pre-updating data becomes the record set in the post-updating data by a UPDATE instruction. Only when the record set in the pre-updating data is equal to the corresponding record of the database 20B having the same key as that of the record set in the pre-updating data, the database 20B is changed such that the corresponding record is made equal to the record set in the post-updating data. To this end, when the record set in the pre-updating data is not equal to the corresponding record of the database 20B having the same key as that of the record set in the pre-updating data, the changing is not performed. Therefore, the record changed by the business application is prevented from being overwritten by an updating content of the database 10B.

In this manner, when logical inconsistency occurs between databases, reflecting of the updating can be prevented. Therefore, a synchronizing process can be performed without causing logical inconsistency to occur between the databases.

When the logical inconsistency occurs, the error log 20E including information representing an inconsistency content is generated and is outputted to an external storage unit. Hence, when a system manager or administrator refers to the error log 20E, it is able to determine how to deal with the logical inconsistency while taking the inconsistency content and an operation state of the database into consideration, in order to eventually achieve matching between the databases.

The error log 20E may be outputted to a medium such as paper or a display device through which the error log 20E can be visually acquainted with. When the updating is prevented from being reflected by the synchronizing process, the error log 20E is outputted so as to be printed onto a paper, or the error log 20E is outputted onto the screen of a display device. In this case, the system manager can be quickly acquainted with the inconsistency content to thereby make it possible to cope and deal with the inconsistency content.

In a collecting process in the updating information collecting unit 10C, information which can specify a database operation instruction of updating to the database 10B may be set in the updating information. More specifically, if the updating process to the database 10B is the registering process, information which can specify that the database operation instruction is an INSERT instruction and a registered record are set in the updating information. Further, when the updating process to the database 10B is a deleting process, information which can specify that the database operation instruction is a DELETE instruction and the deleted record are set in the updating information. Furthermore, when the updating of the database 10B is a changing process, information which can specify that the database operation instruction is an UPDATE instruction and the pre-changing record and the post-changing record serving as pre-updating and post-updating states respectively are set in the updating information. In this manner, on the basis of the information which can specify the database operation instruction set in the updating information and the records, an updating content in the database 10B is specified.

In addition, when the information which can specify the content of the database operation instruction and the record are set in the updating information, in the updating information reflecting unit 20D, the following reflecting process is performed on the basis of the updating information. More specifically, in the case where the database operation instruction is the INSERT instruction, only when the corresponding record having the same key as that of the set record is absent in the database 20B, the set record is registered in the database 20B. Further, in the case where the database operation instruction is the DELETE instruction, only when the corresponding record having the same key as that of the set record is present in the database 20B, the corresponding record is deleted from the database 20B. Furthermore, in the case where the database operation instruction is the UPDATE instruction, only when the record set as a pre-updating state is equal to the corresponding record of the database 20B having the same key as that of the set record, the database 20B is changed such that the corresponding record is made equal to the record set as a post-updating state. In this manner, even though the information which can specify the content of the database operation instruction and the record are set in the updating information, updating can be prevented from being reflected when logical inconsistency occurs between databases, and the synchronizing process can be performed without causing logical inconsistency to occur between the databases.

When the updating performed in the server 20 is to be reflected on the server 10, the same operation as described above may be performed.

In this manner, in the configuration in which databases to be equivalent to each other and arranged in different servers are independently updated, the collecting process, the determining process, and the reflecting process are performed in each of the servers, so that a synchronizing process which reflects updating of one database onto the other database can be performed causing no logical inconsistency to occur between the databases.

The present invention can also be applied to a network computing environment constituted by three or more servers.

It should be understood that many changes, variations and modifications will occur to a person skilled in the art without departing from the scope and sprit of the invention as claimed in the appended claims.

The contents of the Japanese Patent Application No. 2006-180839, filed on Jun. 30, 2006, that forms a basis for claiming the priority is incorporated herein as a part of the present application by reference.

I claim:

1. A computer readable recording medium for use in a network computing environment constructed by servers having a database, respectively, the recording medium having recorded thereon a database synchronizing process program for performing a synchronizing process between a database of one server and a database of another server, wherein the database synchronizing process program causes the servers to perform a method, the method comprising:

receiving updating information including pre-updating and post-updating information from said another server to said one server to perform an updating process, the pre-updating information being a pre-updating record when updating is either deleting or changing a record stored in the database of said another server and the pre-updating information indicating absence of a record when the updating is registering a record in the database of said another server, determining by said one server whether or not a logical inconsistency occurs between the database of said one server and the database of said another server, when, with reference to said updating information, the database of said one server is updated depending on the updating information; and updating the database of said one server on the basis of the updating information when said one server determines by the determining that no inconsistency occurs, wherein the determining determines that the logical inconsistency occurs between the database of said one server and the database of said another server, on condition:

when the updating process to the database of said another server is a registering process and a record, in the database of said one server, having a same key as that of the post-updating information is detected by said one server, when the updating process to the databases of said another server is a deleting process and a record, in the database of said one server, having a same key as that of the pre-updating information is detected by said one server to be absent or different from the pre-updating information, or when the updating process to the database of said another server is a changing process and a record, in the database of said one server, having a same key as that of the pre-updating information is detected by said one server to be different from the pre-updating information.

2. The computer readable recording medium having recorded thereon a database synchronizing process program according to claim 1, further causing the method to include:

generating an error log representing an inconsistency content when it is determined by the determining that the inconsistency occurs.

3. The computer readable recording medium having recorded thereon a database synchronizing process program according to claim 2, wherein the error log includes the updating information and information representing a content of a record to be updated by the updating information.

4. The computer readable recording medium having recorded thereon a database synchronizing process program according to claim 2, further causing the method to include:

outputting the error log generated by the generating to an external storage unit or a medium through which said error log can be visually acquainted with.

5. The computer readable recording medium having recorded thereon a database synchronizing process program according to claim 1, wherein the updating information set therein, as pre-updating data representing a pre-updating state of an updated record of the database and post-updating data representing a post-updating state of the updated record of the database, includes an identifier representing that a record is absent and a registered record, respectively, when the updating process to the database is a registering process, a deleted record and the identifier, respectively, when the updating process to the database is a deleting process, and a pre-changing record and a post-changing record, respectively, when the updating process to the database is a changing process.

6. The computer readable recording medium having recorded thereon a database synchronizing process program according to claim 5, wherein the determining determines that logical inconsistency occurs between the databases, on condition:

when the identifier is set in the pre-updating data and a record having a same key as that of a record set in the post-updating data is detected by said one server to be present in the databases, when the identifier is set in the post-updating data and a record having a same key as that of the record set in the pre-updating data is detected by said one server to be absent in the database or different from the record set in the pre-updating data, or when records are set in the pre-updating data and the post-updating data, respectively, and a record having a same key as that of the record set in the pre-updating data is detected by said one server to be different from the record set in the pre-updating data.

7. The computer readable recording medium in which a database synchronizing process program is recorded according to claim 5, wherein the updating registers in the databases a record set in the post-updating data at a time when the identifier is set in the pre-updating data, deletes the record having a same key as that of the record set in the pre-updating data from the databases at a time when the identifier is set in the post-updating data, and changes the databases so that the record having a same key as that of the record set in the pre-updating data is made equal to the record set in the post-updating data at a time other than the above-mentioned two respective times.

8. The computer readable recording medium having recorded thereon a database synchronizing process program according to claim 1, wherein the updating information sets therein information specifying that a database operation instruction is a registering process instruction and a registered record are set when the updating process to the databases is a registering process, information specifying that the database operation instruction is a deleting process instruction and a deleted record, respectively, when the updating process to the databases is a deleting process, and information specifying that the database operation instruction is a changing process instruction and pre-changing record and a post-changing record serving as pre-updating and post-updating states of an updated record, respectively, when the updating process to the databases is a changing process.

9. The computer readable recording medium having recorded thereon a database synchronizing process program according to claim 8, wherein the determining determines that logical inconsistency occurs between the databases, on condition:

when the database operation instruction is the registering process instruction and a record having a same key as that of the set record is detected by said one server to be registered in the databases, when the database operation instruction is the deleting process instruction and a record having a same key as that of the set record is detected by said one server to be absent in the databases or different from the set record, or when the database operation instruction is the changing process instruction and the record set as the pre-updating state is detected by said one server to be different from a record having a same key as that of the set record.

10. The computer readable recording medium having recorded thereon a database synchronizing process program according to claim 8, wherein the updating registers in the databases the set record when the database operation instruction is the registering process instruction, deletes from the databases the record having a same key as that of the set record when the database operation instruction is the deleting process instruction, and updates the databases so that the record having a same key as that of the record set as the pre-updating state is made equal to a record set as the post-updating state when the database operation instruction is the changing process instruction.

11. The computer readable recording medium having recorded thereon a database synchronizing process program according to claim 1, wherein the updating information is held for each unit of transactions.

12. A database synchronizing process apparatus for performing a synchronizing process between a database of one server and a database of another server in a network computing environment constituted by servers having a database, respectively, comprising:

receiving means for receiving updating information including pre-updating and post-updating information from said another server to said one server to perform an updating process, the pre-updating information being a pre-updating record when updating is either deleting or changing a record stored in the database of said another server and the pre-updating information indicating absence of a record when the updating is registering a record in the database of said another server, determining means for determining by said one server whether or not logical inconsistency occurs between a database of said one server and a database of said another database when, with reference to said updating information, the database of said one server is updated depending on the updating information; and updating means for updating the database of said one server on the basis of the updating information when said one server determines by the determining means that no inconsistency occurs, wherein the determining means determines that the logical inconsistency occurs between the databases of said one server and the database of said another server, on condition:

when the updating process to the databases of said another server is a registering process and a record, in the database of said one server, having a same key as that of the post-updating information is detected by said one server, when the updating process to the databases of said another server is a deleting process and a record, in the databases of said one server, having a same key as that of the pre-updating information is detected by said one server to be absent or different from the pre-updating information, or when the updating process to the databases of said another server is a changing process and a record in the databases of said one server, having a same key as that of the pre-updating information is detected by said one server to be different from the pre-updating information.

13. A database synchronizing process method of performing a synchronizing process between a database of one server and a database of another server in a network computing environment constituted by servers each having a database, the method comprising:

receiving updating information including pre-updating and post-updating information from said another server to said one server to perform an updating process, the pre-updating information being a pre-updating record when updating is either deleting or changing a record stored in the database of said another server and the pre-updating information indicating absence of a record when the updating is registering a record in the database of said another server, determining by said one server whether or not logical inconsistency occurs between the database of said one server and the database of said another server, when, with reference to said updating information, the database of said one server is updated depending on the updating information; and updating the database of said one server on the basis of the updating information when said one server determines in the determining that no inconsistency occurs, wherein the determining determines that the logical inconsistency occurs between the databases of said one server and the database of said another server, on condition:

when the updating process to the databases of said another server is a registering process and a record, in the database of said one server, having a same key as that of the post-updating information is detected by said one server, when the updating process to the databases of said another server is a deleting process and a record, in the databases of said one server, having a same key as that of the pre-updating information is detected by said one server to be absent or different from the pre-updating information, or when the updating process to the databases of said another server is a changing process and a record, in the databases of said one server, having a same key as that of the pre-updating information is detected by said one server to be different from the pre-updating information.

\* \* \* \* \*